United States Patent [19]
Osterwalder

[11] Patent Number: 5,521,694
[45] Date of Patent: May 28, 1996

[54] LASER BEAM PATH PROFILE SENSOR SYSTEM

[75] Inventor: Johann M. Osterwalder, Encinitas, Calif.

[73] Assignee: Innova Laboratories, Inc., San Diego, Calif.

[21] Appl. No.: 240,446

[22] Filed: May 10, 1994

[51] Int. Cl.$^6$ ............................................. G01C 3/00
[52] U.S. Cl. ............................................. 356/3.08
[58] Field of Search ............................. 356/3.01, 3.02, 356/3.03, 3.06, 3.07, 3.08, 3.10, 5.09, 5.10

[56] References Cited

U.S. PATENT DOCUMENTS

| | | | |
|---|---|---|---|
| 4,701,052 | 10/1987 | Schoen | 356/369 |
| 4,829,172 | 5/1989 | Miller | 250/205 |
| 4,963,017 | 10/1990 | Schneiter | 356/3.01 |
| 5,015,868 | 5/1991 | Park | 250/561 |
| 5,113,080 | 5/1992 | Leu | 250/561 |
| 5,210,585 | 5/1993 | Suzuki | 356/3.08 |
| 5,260,762 | 11/1993 | Telle | 356/5.09 |
| 5,373,344 | 12/1994 | Kakiuchi | 356/3.01 |

FOREIGN PATENT DOCUMENTS 2-154188  6/1990  Japan ................................. 356/5.09

Primary Examiner—Thomas H. Tarcza
Assistant Examiner—Pinchus M. Laufer
Attorney, Agent, or Firm—John R. Duncan; Frank D. Gilliam

[57] ABSTRACT

A laser beam profile sensor system for which is capable of accurately determining distances to both close and distant objects, particles, liquid interfaces and the like and of identifying the locations of ice layers on metal surfaces. Basically, the system includes a laser diode for generating a laser beam along a selected path, a receiver spaced from the laser diode for receiving light along a receiver axis, the laser beam and receiver axis intersecting at any desired angle from nearly 0° to nearly 180°. The receiver comprises a linear array of light responsive elements. An optical system is provided for directing light approaching the receiver along the receiver axis to the array. An electronic circuit processes signals from the array elements and produces a display showing the distance to any target lying along the laser beam path that reflects light along the receiver axis.

21 Claims, 1 Drawing Sheet

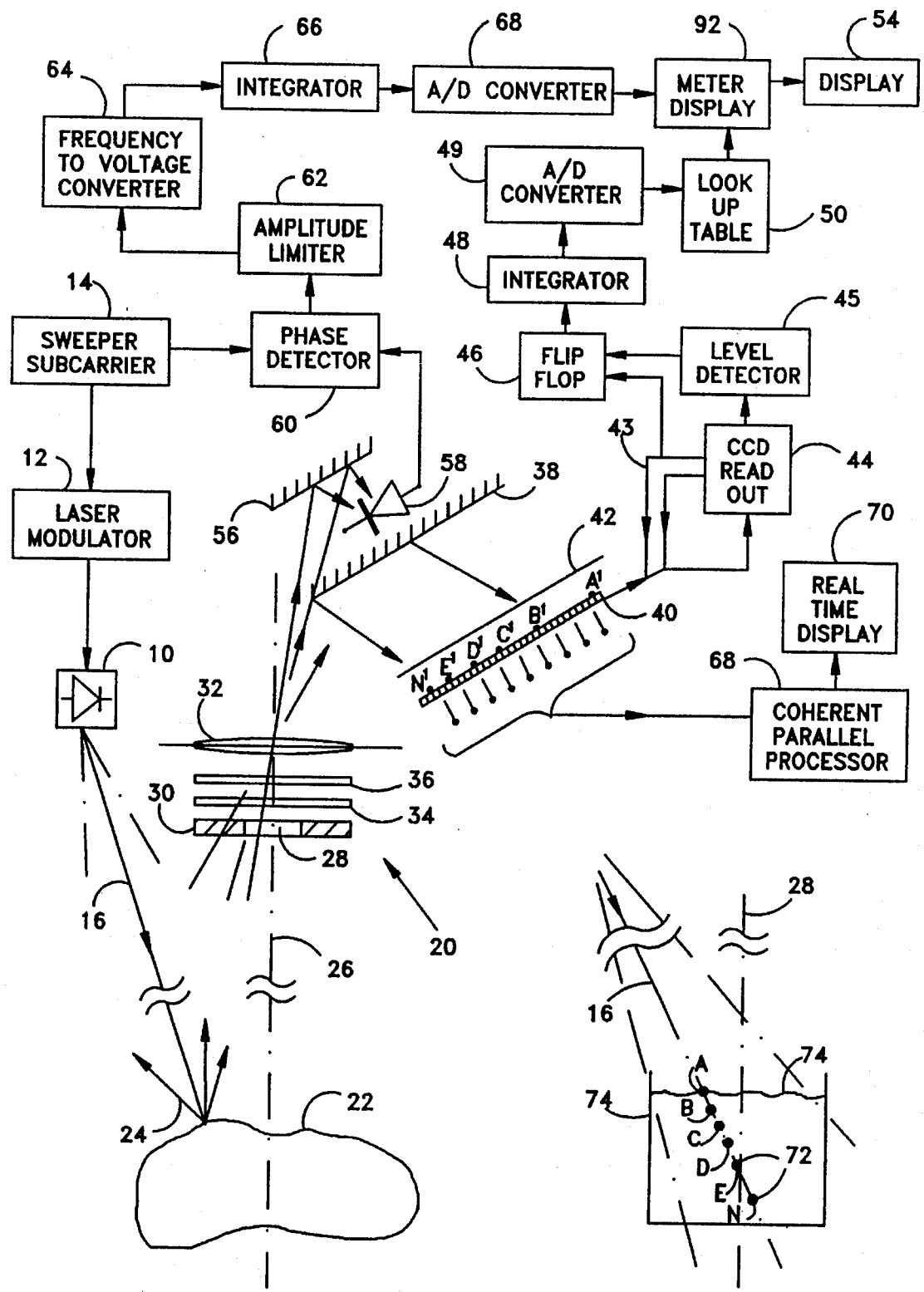
*FIGURE 1* *FIGURE 2*

LASER BEAM PATH PROFILE SENSOR SYSTEM

BACKGROUND OF THE INVENTION

This invention relates in general to non-contact sensing of features of solids and liquids and, more specifically, to a laser beam system for sensing distance to an object, the identification and locating of interfaces between different liquids or of particles in a liquid and the determination of other physical features.

Precise measurement of distances to objects, in particular inaccessible objects, has long been accomplished by triangulation using trigonometric functions. Typically, two mirrors along a base normal to the line of sight to the object are adjusted to provide a single image. The distance to the object can be calculated using the mirror angles and the base length. Such rangefinders have had extensive application in cameras, artillery rangefinding and the like.

A number of different devices have been developed using triangulation techniques, such as those described by Z. Ji and M. C. Leu, "Design of Optical Triangulation Devices". Optical & Laser Technology, Vol. 21, No. 5, 1989. Applications of triangulation distance measurement include cameras as described by Misawa et al. in U.S. Pat. No. 5,274,429, and by Higaki et al. in U.S. Pat. No. 5,253,032, long range distance measurement as described by Beder et al. in U.S. Pat. No. 5,057,681 and by Ryczek in U.S. Pat. No. 5,055,664 and others. The prior triangulation devices generally use position sensitive devices as the reflected light detectors for the reflected light which limits system accuracy and application potential. Accuracy at long distances is lost unless a high base-to-object distance ratio is used. With very long bases, stable mechanical coordination of the light emitter and detector is difficult.

These prior triangulation and position sensitive devices and methods also suffer from a limited target range and target depth capability and are generally only capable of detecting a single target at any given moment.

Thus, there is a continuing need for improved systems for more accurately measuring distances over an expanded range of distances, for simultaneously detecting a large number of targets, such as particles in a liquid and for observing dynamic behavior of particles or liquid interfaces in real time.

SUMMARY OF THE INVENTION

The above-noted problems, and others, are overcome in accordance with this invention, by a laser beam path profile sensor basically comprising a laser diode for generating a polarized laser beam, and a lens system for collimating the laser beam and directing the beam along a path at a small angle to a receiver axis. The laser beam illuminates any target or particles along the beam path. A receiver optical assembly includes a suitable imaging lens and, in some cases, a filter, polarizer and diaphragm along the receiver axis. The targets are imaged by the receiver lens system onto a one dimensional optical receiver array that is inclined to the receiver optical axis so that a multiplicity of targets at various distances can be simultaneously imaged in focus on the receiver array.

Any suitable receiver array that can detect light at the transmitter frequency may be used. Excellent results are obtained with charge-coupled devices (CCD) and photo diode arrays. CCD's are preferred because they have a built in micro scale by the nature of the individual pixels which are electrically separated from each other. The individual pixels can be used as fixed reference points for the distance measurement process in a signal processor. Each spatial position of a pixel along the CCD is addressable by calling out a specific number which corresponds to a specific object distance.

The receiver optical system preferably includes a rectangular slot that restricts the aperture width of the following optical lens to improve the accuracy of the system. An optical bandpass filter and, in some cases, a beam polarizer are preferably inserted in front of the receiver lens to attenuate all light components other than the reflected laser light from the target area to allow operation of the system in full sunlight or to favor certain polarized light conditions.

Preferably, plane mirrors are provided between the receiver optical system and the receiver array to fold the incoming beam and extend the focal length of the imaging lens without increasing the physical length of the system configuration.

The optical receiver array is positioned along a straight line at the geometrical location where all target signals come into focus. A beam intensity controller, in the form of a specially shaped elongated diaphragm, is preferably positioned in front of the receiver array to keep the light intensity of similar targets from various distances constant in spite of the proportional relationship of I to $1/R^4$, where I is light intensity and R is the target distance. The beam controller corrects by a factor of $1/R^2$ and the imaging lens demagnification compensates by an additional factor of $1/R^2$.

The distance output information is generated by an electronic circuit including a logic circuit (array control signals) that scans the receiver array. Two parallel J-K flip flop pulses are generated for each scan, which are proportional to the time span between the start of the receiver array scan and the position of the first target occurring during that scan. One pulse terminates at the beginning of the first target and the other pulse terminates at the end of the first target. The triggers for the flip-flops are provided by a level detector circuit. These pulses are added, integrated and converted into a digital signal which is fed to a look-up table, other appropriate electronic device, that produces a digital output with a conventional digital or meter display. Two gate pulses are required to eliminate variations in the target reflectivities of differently colored surfaces, which otherwise would lead to variations in the measured distance to the target.

Accordingly, it is an object to provide an improved distance measuring system capable of improved accuracy over a wide range of distances. Another object is to provide a small, portable, distance measurement system which includes the benefits of large, long focal length, wide base, systems. A further object is to provide a system that is capable of measuring distances to a plurality of targets simultaneously. Yet another object is to provide capability of analyzing liquids for the presence and quantity of particles and other impurities. Still a further object is to display in real time variations under dynamic conditions.

BRIEF DESCRIPTION OF THE DRAWING

Details of the invention, and of preferred embodiments thereof, will be further understood upon reference to the drawing, wherein:

FIG. 1 is a schematic diagram of a laser beam path profile sensor system of this invention; and FIG. 2 is a detail schematic view of a second embodiment of the target portion of the diagram of FIG. 1

DETAILED DESCRIPTION OF PREFERRED EMBODIMENTS

As seen in FIG. 1, a laser diode 10, typically a TOLD 9215 from Toshiba, is current modulated in a conventional manner by a driver circuit 12, such as a RAM 3 transistor amplifier from Mini-Circuits, which is fed by a frequency modulated continuous wave sweeper (called a sub carrier device) 14, typically a HTO-1000 from Avantek. Laser beam 16 is directed along a selected, usually fixed, path. Laser beam 16 may be scanned across a narrow angle for some purposes, as discussed below.

The optical axis 26 of a receiver assembly 20 is normally positioned at a small angle to laser beam 16, preferably from about 0.5° to 5°. However, angles as great as close to 180° can be used for observations of forward scattering in liquids. Light from laser beam 16 striking a target 22 (which may be any object where the distance between the measuring system and the object is needed) is scattered as shown at 24.

Some of the scattered light 24 is reflected along receiver axis 26. The receiver input is limited by a rectangular slot 28 in aperture plate 30, restricting the aperture width of imaging lens 32. An optical bandpass filter 34 is preferably used in front of lens 32 to attenuate all light components other than the reflected laser light from the target area, to allow operation of the instrument in full sunlight. For some purposes, as detailed below, it is desirable to include a beam polarizer 36 along receiver axis 28.

A first plane mirror 38 is preferably provided to allow the incoming beam to be folded, which increases the focal length of imaging lens 32 without increasing the physical length of receiver assembly 20.

Optical receiver array 40 is positioned along a straight line along the geometrical location where all target signals come into focus. A beam intensity controller 42 is positioned in front of the receiver array to keep the light intensity of similar targets from various distance constant in spite of the $1/R^4$ image intensity relationship discussed above. Beam Intensity controller 42 iS a specially shaped diaphragm to block light to a varying degree along the receiver array. The shape of the diaphragm is typically a slit with a parabolically varying width.

Where array 40 is an array of charge coupled devices (CCD), the processing system includes a logic circuit 44, typically a RC0730LNM from EG & G Reticon, which scans the CCD. Logic circuit 44 provides control signals to the CCD array 40 through lines 43. A level threshold detector 45 (typically a 74C14 from National Semiconductor) is adjusted to detect a selected minimum amplitude level. A pair of J-K Flip flops 46 (typically available from National Semiconductor under the model 4013 designation) receives signals from level detector 45 and generate a pair of pulses with slightly different width for each scan which are proportional to the time span between the start of the CCD scan to the beginning and end positions of the first target occurring during that scan. An integrator 48, typically a 741 operational amplifier from National Semiconductor (or a simple RC network with a long time constant) integrates the pulses and a standard analog to digital converter 49 converts the resulting voltage into a digital signal which is fed to a look-up table 50, typically an integrated circuit chip such as a 68HC05 from Motorola. The output of the look-up table is the measured distance, in feet or meters as desired, and is directed to a meter 92 and/or a digital display 54.

The system as described, using only optical receiver array 40, is very accurate at short distances, but less accurate at longer distances. The range of the system is extended by the inclusion of a second plane mirror 56, which receives modulated light from distant objects that misses the near end of mirror 38. The image from distant objects falls on a high speed photo diode 58 such as a PD 1002 available from Mitsubishi which recovers the microwave subcarrier signal that passes through a phase detector of the sort available form Mini Circuts under the model RMS-11F designation, an amplitude limiter 62 (typically a pair of IN4148 diodes), a frequency to voltage converter 64 (typically a VFC42 from Burr-Brown), an integrator 66, an analog to digital converter (such as an ADC from Burr-Brown) and finally to the meter 52 and/or digital display 54.

With this addition the operation of the instrument can be switched to a far target range whereby the laser diode 10 is amplitude modulated by a swept microwave sub-carrier via modulator 12 and sub-carrier generator 14, typically sweeping from about 1 to 2 GHz. The return signals are now detected by the high speed photo diode 58 instead of the receiver array 40 which is out of range due to the positioning of first mirror 38.

The loss of precise accuracy in the CCD array 40 is a consequence of the progressively smaller lateral shifts of the target images as the distances to the targets increase. It is for this reason that a single high speed photo diode 58 which has a typical 2500 µm diameter can cover the entire desired far range image area. The photo diode output which consists of the reflected subcarrier signal and a reference signal are delivered to the phase comparator (mixer) 60 which delivers an output beat signal with a frequency that is proportional to the target distance. The signal processor is completed by suitable beat signal amplification at detector 60, followed by limiting at an amplitude limiter 62, a cycle counter at converter 64 which delivers voltage that is integrated and displayed on the same display meter and digital display as for the close in target. The range of the system thus can be extended from very close with array 40 and element 58 to several hundred feet especially if a retro-reflector is used at the desired target location.

If desired, an array of high speed photo diodes may be used as the receiver array 40 instead of charge coupled devices. In this case, the photo diode 58 and second mirror 56 are not needed to cover the longer target ranges. Coherent, high speed operation can be achieved from any desired element of a photo diode receiver array 40. The output of the photo diode array is processed through a coherent parallel processor 68 (consisting of a large number of parallel circuits corresponding to phase detector 60, limiter 62, converter 64 and integrator 66) and typically displayed on a real time display 70, typically an oscilloscope. This configuration has the further advantage that coherent parallel processing is possible with a multiplicity of targets, a feature not available with CCD devices since they are read out sequentially at speeds that do not exceed, typically, about 15 MHz. However, instrument complexity is increased and the element sizing and spacing of high speed photo diode arrays are much coarser than those of CCDs.

The photo diode receiver array is particularly useful in analyzing liquids and vapors which constitute a multiplicity of scattering targets along the path of the laser beam. As seen in the schematic detail view of FIG. 2, a container 72 of liquid may be used as the target in place of target 22 as seen in FIG. 1. Particles 74 at different depth, identified in order by letters "A" through "E" and "N' for the last of a longer series, may be detected and their locations measured. If the liquids or vapors are partially transparent, real time parallel processing of that media can reveal important parameters of composition and dynamic behavior. If the system is operated in a coherent mode but with fixed frequency carrier phase information along the path of the laser beam, changes in the refractive index of the media as a function of distance can be determined. For example, the system can detect water in gasoline tanks. It is also possible to evaluate the quality of liquids as to their impurities or traces of micro particles, such as metal particles in engine oils. A laser diode 10 that is wavelength tunable may be preferred, since certain impurities will have specific absorption bands affecting the probing laser beam 16.

Signals corresponding the particles 74 identified by letters reach array 40 at different locations along the array corresponding to their distances from laser diode 10. These locations are schematically indicated by letters A' through E', with N' indicating the last of a longer series.

With a multiple target such as shown in FIG. 2, a narrow fan beam or a scanned laser beam 16 is preferred. In one application, a scanned laser beam 16 may be used to detect the presence or absence of ice on an airplane wing. The thickness and surface details of ice forming under a layer of water can be measured. The transmitted light beam in this application is polarized, but the reflected light from ice is unpolarized light and the reflected light from metal is still polarized, providing a sufficient difference in reflection characteristics to permit very thin layers of ice to be detected.

While certain specific relationships, components and other parameters have been detailed in the above description of preferred embodiments, those can be varied, where suitable, with similar results. If desired, many of the functions performed by components identified in the block diagram of FIG. 1 can be accomplished by software controlling conventional microprocessors such as the MC 68MC711E9 from Motorola. Other applications, variations and ramifications of the present invention will occur to those skilled in the art upon reading the present disclosure. Those are intended to be included within the scope of this invention as defined in the appended claims.

I claim:

1. A laser beam path profile sensor system comprising:

a laser diode for generating a laser beam along a selected beam path;

receiver means spaced from said laser diode for receiving light along a receiver axis;

said laser beam path and receiver axis intersecting at an angle of from about 0.5° to 179.5°;

said receiver means comprising a linear array of discrete light responsive elements;

a first plane mirror for reflecting light received from a target generally along said receiver axis to said receiver linear array, said first mirror oriented to reflect only light received from targets closer than a selected distance from said sensor system;

a second plane mirror for reflecting light received from a target to a photo diode, said second mirror oriented to only reflect light which is received from targets further than said selected distance from said sensor system;

means for generating a distance signal representing the distance to said target from said sensor system;

said array lying at an angle of up to about 60° to the normal of the optical axis of the receiver; and electronic circuit means for receiving electrical signals from said array elements and producing a display showing the distance to any target lying along the laser beam path that reflects said beam along said receiver axis.

2. The laser beam path profile sensor system according to claim 1 further including:

a lens means for imaging light passing along said receiver axis on said array;

a bandpass filter to limit light to substantially the frequency produced by said laser diode;

a rectangular slot for restricting the aperture width; and at least one plane mirror for reflecting light passing along said receiver axis to said array.

3. The laser beam path profile sensor system according to claim 2 further including a beam intensity controller adjacent to said array to maintain the light intensity along the array substantially constant.

4. The laser beam path profile sensor system according to claim 2 further including polarizing means along the receiver axis in advance of said lens means.

5. The laser beam path profile sensor system according to claim 1 wherein said receiver array comprises a linear array of charge coupled devices.

6. The laser beam path profile sensor system according to claim 5 wherein said electronic circuit means comprises:

a logic means which scans the array;

a flip-flop pair means for generating target voltage pulses for each scan which are proportional to the time span between the start of the scan and the positions of the beginning and end of the first target signal occurring during the scan;

means for integrating the target pulses and for converting the voltage pulse into a digital signal;

look-up table means for generating a distance signal in selected units from said digital signal; and display means for displaying the distance to said target in said selected units.

7. The laser beam path profile sensor system according to claim 1 wherein said receiver array comprises a linear array of independent photo diodes.

8. The laser beam path profile sensor system according to claim 7 wherein said electronic circuit means comprises coherent processor means for processing in parallel the outputs from said photodiode array and producing distance signals in accordance with the distance to at least one target; and display means for displaying the distance to selected targets in accordance with said distance signals.

9. The laser beam path profile sensor system according to claim 1 wherein said means for generating a distance signal comprises means to modulate said laser diode, a phase comparator for producing an output beat signal having a frequency that is proportional to the target distance and signal processor means.

10. The laser beam path profile sensor system according to claim 9 wherein said signal processor comprises in seriatim an amplitude limiter, frequency to voltage converter, integrator, analog to digital converter and display means for displaying the target distance in selected units.

11. The laser beam path profile sensor system according to claim 1 wherein said laser diode is wavelength tunable for detecting impurities having different selected wavelength absorption characteristics.

12. The laser beam path profile sensor system according to claim 1 further including means for scanning said laser diode and polarizing means along said receiver axis whereby said sensor system can detect ice layers on a metal surface.

13. A laser beam path profile sensor system comprising:

a laser diode for generating a laser beam along a selected beam path towards a selected target;

receiver means spaced from said laser diode for receiving light reflected along a receiver axis from a target;

said laser beam path and receiver axis intersecting at an angle of from about 0.5° to 179.5°:

said receiver means comprising a linear array of discrete charge coupled devices;

a first plane mirror for directing light reflected along said receiver axis, from a target closer than a selected distance, to said array;

said array lying at an angle to the optical axis of the received light;

said receiver means further comprising a photo diode;

a second plane mirror for directing light reflected along said receiver axis, from a target further than a selected distance, to said array electronic circuit means for receiving electrical signals from said array charged coupled devices and from said photo diode and producing a display showing the distance to any target lying along the laser beam path that reflects said beam along said receiver axis.

14. The laser beam path profile sensor system according to claim 13 further including:

a lens means for imaging light passing along said receiver axis on said charge coupled device array;

a bandpass filter to limit light to substantially the frequency produced by said laser diode; and a rectangular slot for restricting the aperture width.

15. The laser beam path profile sensor system according to claim 14 further including a beam intensity controller adjacent to said charge coupled device array to maintain the light intensity along the charge coupled device array substantially constant.

16. The laser beam path profile sensor system according to claim 14 further including polarizing means along the receiver axis in advance of said lens means.

17. The laser beam path profile sensor system according to claim 13 wherein the electronic circuit means for generating a distance measurement for said distances shorter than said selected distance which comprises:

a logic means which scans the charge coupled device array;

a flip-flop pair means for generating target voltage pulses for each scan which is proportional to the time span between the start of the scan and the beginning and end of the position of the first target signal occurring during the scan;

means for integrating the target pulses and for converting the voltage pulse into a digital signal;

look-up table means for generating a distance signal in selected units from said digital signal; and display means for displaying the distance to said target in said selected units.

18. The laser beam path profile sensor system according to claim 13 wherein the electronic circuit means for generating a distance measurement for said distances longer than said selected distance comprises means to modulate said laser diode, and a phase comparator for producing an output beat signal having a frequency that is proportional to the target distance and signal processor means.

19. The laser beam path profile sensor system according to claim 18 wherein said signal processor means comprises in seriatim an amplitude limiter, frequency to voltage converter, integrator, analog to digital converter and display means for displaying the target distance in selected units.

20. The laser beam path profile sensor system according to claim 13 wherein said laser diode is wavelength tunable for detecting impurities having different selected wavelength absorption characteristics.

21. The laser beam path profile sensor system according to claim 13 further including means for scanning said laser diode and polarizing means along said receiver axis whereby said sensor system can detect ice layers on a metal surface.

* * * * *